O. A. KNOPP.
ELECTRIC WATT HOUR METER.
APPLICATION FILED NOV. 20, 1916.
1,300,176.
Patented Apr. 8, 1919.
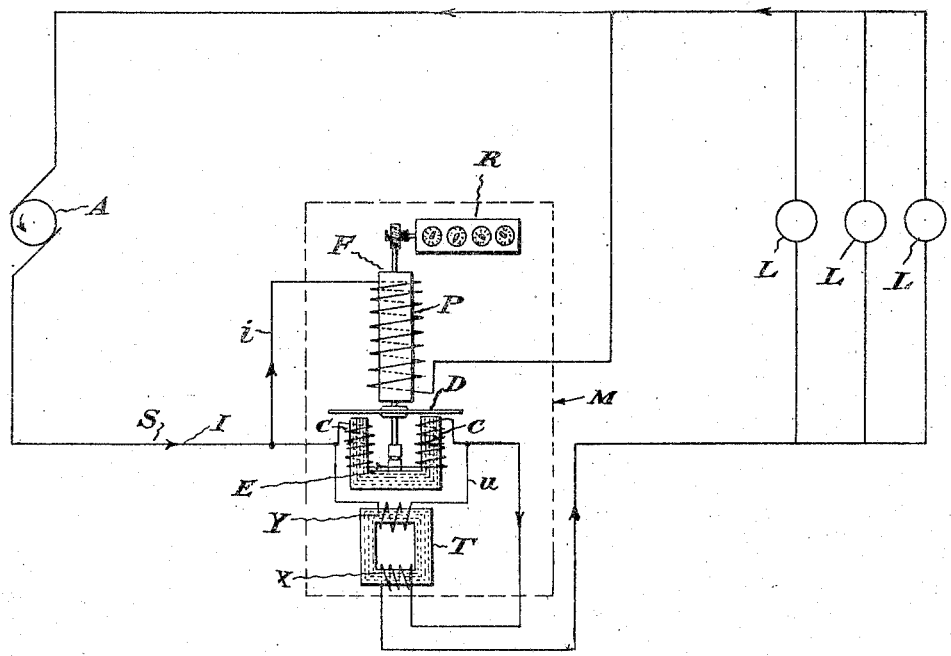
WITNESSES:
INVENTOR.

UNITED STATES PATENT OFFICE.

OTTO A. KNOPP, OF OAKLAND, CALIFORNIA.

ELECTRIC WATT-HOUR METER.

1,300,176.　　　　　　Specification of Letters Patent.　　Patented Apr. 8, 1919.

Application filed November 20, 1916. Serial No. 132,247.

*To all whom it may concern:*

Be it known that I, OTTO A. KNOPP, a citizen of the United States, residing at the city of Oakland, county of Alameda, and State of California, have made a new and useful Improvement,—to wit, Improvements in Electric Watt-Hour Meters; and I do hereby declare the following to be a full, clear, concise, and exact description of the same.

The object of this invention is to provide means to prevent the under-registration or under-recording of alternating current induction type watthour meters on over-loads.

In this specification and the annexed drawings the invention is illustrated in the form considered to be the best, but it is understood that the invention is not limited to such form because it may be embodied in other forms, and it is also to be understood that in and by the claims following the description it is desired to cover the invention in whatever form it may be embodied.

At present all makes of induction type watthour meters "under-register" as soon as more than normal full-load current is sent through the meter. On twice normal-load, the under-registration is invariably from two to three per cent., increasing gradually until it under-registers from ten to fifteen per cent. on four time normal current. This under-registration causes great losses to electric lighting companies, as it is essential to put a rather small capacity meter in place to register a consumer's load, in order to be sure to register the current of the small current consuming devices, such for instance as porch lights, night lamps, etc. To make it possible to place meters, which measure the consumer's small loads and also register the heavy loads accurately without under-registration, it is proposed to place a transforming device either externally and electrically connected with the meter or modify the construction of the meter sufficiently as to include a transforming device which has such a characteristic that a current is either added to or subtracted from the natural load current flowing through the meter. This current if added shall be of such proportion that it not only increases proportionately with the load but after a certain load current is reached increases more rapidly with the load. If it is subtracted it shall, though increasing with the load, when a certain point is reached, increase less rapidly than the load. Either subtraction or addition can take place in the same current coil or in a separate one in proximity to said current coil.

The accompanying one sheet of drawing shows a wiring diagram in accordance with this invention. The drawing shows the connection of the transforming device T. S represents the service wires supplying the load L. The current I flowing from the source A flows through the current coils C C of the meter M. The potential current $i$ flows through the potential coil P. The currents I and $i$ cause the disk D to revolve and register on the register R according to conventional meter practice. The current I besides passing through the current coils C C goes also through the primary X of the transforming device T and the transformed current $u$ transformed in the secondary Y of the transforming device T is sent through the current coils C C. The transforming device T is made with a rising or drooping characteristic so that the addition or subtraction respectively of the current $u$ to or from the current I flowing through the current coils C C will cause such resultant current to flow through the coils C C so as to counteract the drooping of the characteristic to the meter M. The transforming device T could be built into the current coil core E or the potential coil core F. The primary and secondary coils, $y$ and $x$ being connected the same.

Having thus described this invention, what I claim and desire to secure by Letters Patent is:

1. In combination with an induction watt hour meter having a potential coil and a current coil, a transformer having a primary winding connected in series with said current coil, and means comprising the secondary winding of said transformer for superposing a magneto-motive force on the magneto-motive force of said series coil.

2. In combination with an induction watt hour meter having a current coil, a transforming device having a primary winding connected in series with the said current coil and a secondary winding connected in parallel with said current coil.

In testimony whereof, I have hereunto set my hand at San Francisco, California, this 11th day of November, 1916.

OTTO A. KNOPP.

In presence of—
 BALDWIN VALE,
 A. J. HENRY.